(12) United States Patent
Shibata et al.

(10) Patent No.: US 6,441,327 B1
(45) Date of Patent: Aug. 27, 2002

(54) LEVER SWITCH INCLUDING KNOB, BOOT AND WIRING HARNESS

(75) Inventors: Takeshi Shibata; Toshiya Otani; Yasuo Miyase, all of Tokyo (JP)

(73) Assignee: Niles Parts Company, Ltd. (JP)

( * ) Notice: Subject to any disclaimer, the term of this patent is extended or adjusted under 35 U.S.C. 154(b) by 78 days.

(21) Appl. No.: 09/676,527

(22) Filed: Oct. 2, 2000

(30) Foreign Application Priority Data

Oct. 4, 1999 (JP) .......................................... 11-283146

(51) Int. Cl.[7] .............................. H01H 3/16; H01H 9/00; H01H 25/04; H02B 1/26
(52) U.S. Cl. ............................... 200/61.27; 200/61.54; 200/292; 200/335
(58) Field of Search ........................ 200/61.27–61.38, 200/61.54–61.57, 293–308, 329–345, 292

(56) References Cited

U.S. PATENT DOCUMENTS

| | | | | |
|---|---|---|---|---|
| 5,670,765 A | * | 9/1997 | Yokoyama et al. | 200/61.54 |
| 5,780,794 A | * | 7/1998 | Uchiyama et al. | 200/5 R |
| 5,828,021 A | * | 10/1998 | Uchiyama et al. | 200/293 |
| 5,920,047 A | * | 7/1999 | Akimoto et al. | 200/335 |
| 5,977,494 A | * | 11/1999 | Sano et al. | 200/61.54 |
| 6,034,338 A | * | 3/2000 | Uchiyama | 200/292 X |

FOREIGN PATENT DOCUMENTS

JP    5-69840    9/1993

* cited by examiner

*Primary Examiner*—J. R. Scott
(74) *Attorney, Agent, or Firm*—Rader, Fishman & Grauer PLLC; Ronald P. Kananen, Esq.

(57) ABSTRACT

A lever switch is provided having an operating first knob 14 and a lever rod 3. The lever rod 3 has one end pivotally disposed in a case 6 and the other end disposed to project from the case. The first knob 14 and a boot 22 are disposed side by side. The first knob 14 has a first opening 14a that opposes a second opening 22c of the boot 22. As a result of this construction, the first opening, lever rod, and wire harness of the lever switch cannot be seen from outside, and the lever switch has an operating portion of good appearance in its entirety.

16 Claims, 9 Drawing Sheets

LEVER SWITCH INCLUDING KNOB, BOOT AND WIRING HARNESS

BACKGROUND OF THE INVENTION

1. Field of the Invention

The present invention relates to various types of lever switches with a lever for operating, for example, a wiper-and-washer switch for an automobile, the lever having a knob that has an opening and is attached to an end portion of the lever.

2. Description of the Prior Art

A conventional on-vehicle combination switch is disclosed in Japanese Utility Model Preliminary Publication (KOKAI) No. 5-69840. The on-vehicle combination switch disclosed in the publication has a knob attached to an end of an operating lever, the knob having an opening that can be seen by the operator. The operating lever has the knob at its tip portion and a base slidably journaled on a supporting unit. The operating lever has an exposed middle portion. The operating lever incorporates a switch mounted to the knob and electrically conductive members that electrically connect the supporting unit to the switch.

On-vehicle combination switches other than that disclosed in the aforementioned publication typically have a wire harness that connects between the switch mounted to the knob and the supporting unit. The wire harness passes through a through-hole formed in the operating lever.

However, the aforementioned prior art apparatus suffers from the problem that the interior of the knob and lever can be seen through the opening of the knob, and therefore, the appearance of the operating lever is not attractive.

The wire harness, which electrically connects the supporting unit to the contacts of the switch housed in the knob, can be seen from the operator side, and therefore the appearance of the conventional switch is not attractive. In addition, the wire harness is routed by manually inserting the wire harness into the operating lever. Thus, when the wire harness is routed, workability is poor.

SUMMARY OF THE INVENTION

An object of the present invention is to provide a lever switch in which the opening of the knob, the lever, and the wire harness cannot be seen, and which has an operating portion of good appearance in its entirety.

The present invention was made in order to solve the aforementioned prior art problems.

According to a broad aspect of the present invention, a lever switch is provided having a lever rod with a first knob and a boot, the lever rod being arranged such that one end of the lever rod is pivotal in a case and the other end thereof projects outwardly from the case, and the boot receiving the lever inserted thereinto and being fixed to the case. The lever switch is characterized by the first knob having a first opening formed on a side of the first knob facing the case, and the boot having a second opening formed to oppose the first opening, the second opening being in the vicinity of the first opening of the first knob.

According to other features of the invention, the boot includes a lower boot that covers a wire harness that connects to a switch mounted to the lever rod, and an upper boot that fits to the lower boot. The lower boot has a cover formed in one piece construction with the lower boot, the cover covering a circuit board mounted to a electrode board that is provided at a base of the lever rod. The lower boot is fixed to the electrode board, and the upper boot is fixed to the case that engages the electrode board. The boot is provided on one side of the first knob opposing the case, and a rotary second knob is provided on the other side of the first knob; wherein outer surfaces of the rotary second knob, the first knob, and the boot are continuously aligned to form a substantial cone shape.

DETAILED DESCRIPTION OF THE INVENTION

An embodiment of the present invention will be described in detail with reference to FIGS. 1–13.

An operating lever 1 is used for operating a wiper-and-washer switch incorporated in, for example, a combination switch for an automobile. The operating lever 1 according to the embodiment of the invention will be described in detail as an operating member for a wiper-and-washer switch. The operating lever 1 may also be used as an operating member for a turn signal switch and dimmer switch.

Figure 3:
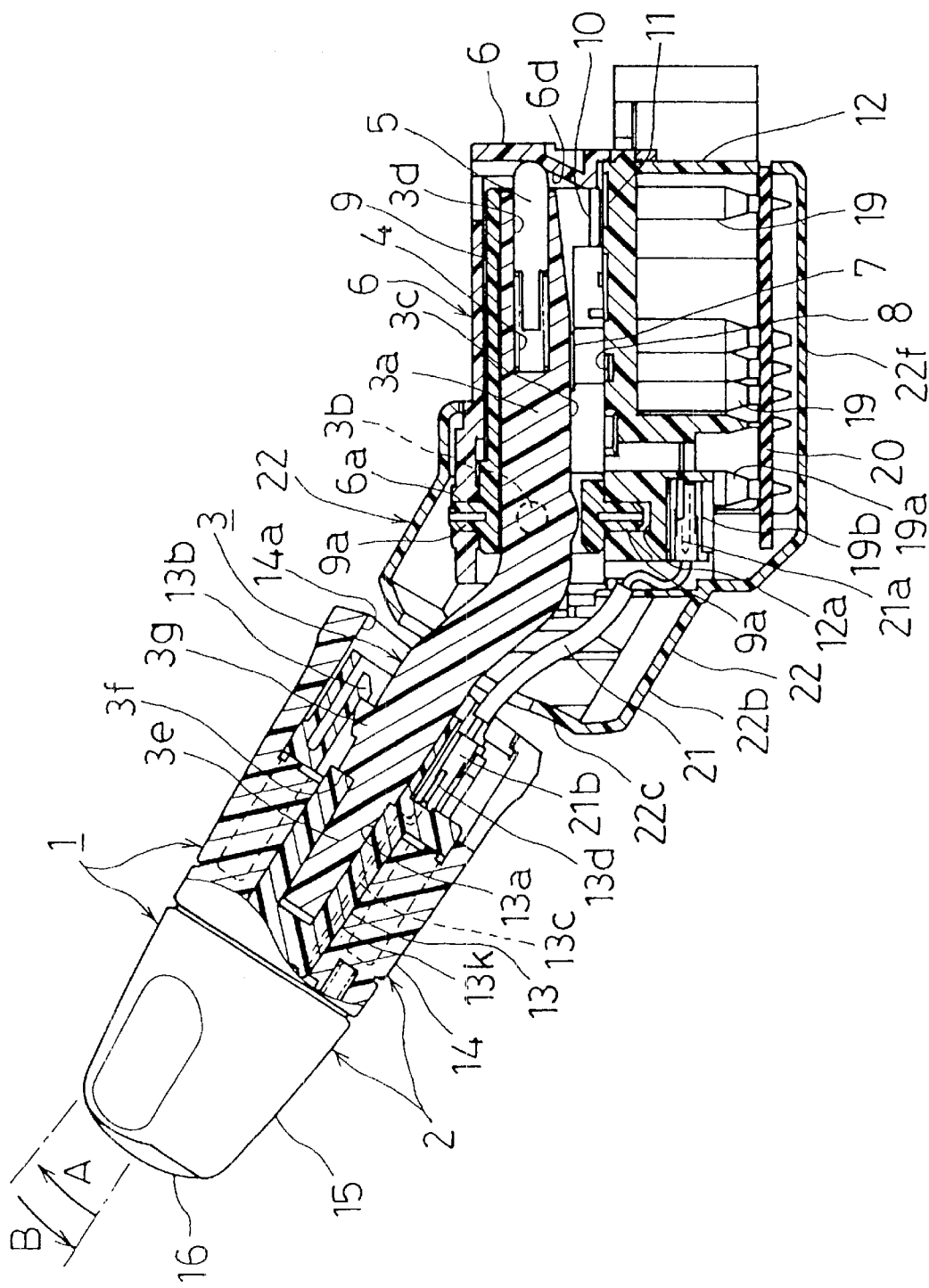
FIG. 3 is a front view with a partial cross-sectional view illustrating the embodiment of the invention.
Figure 4:
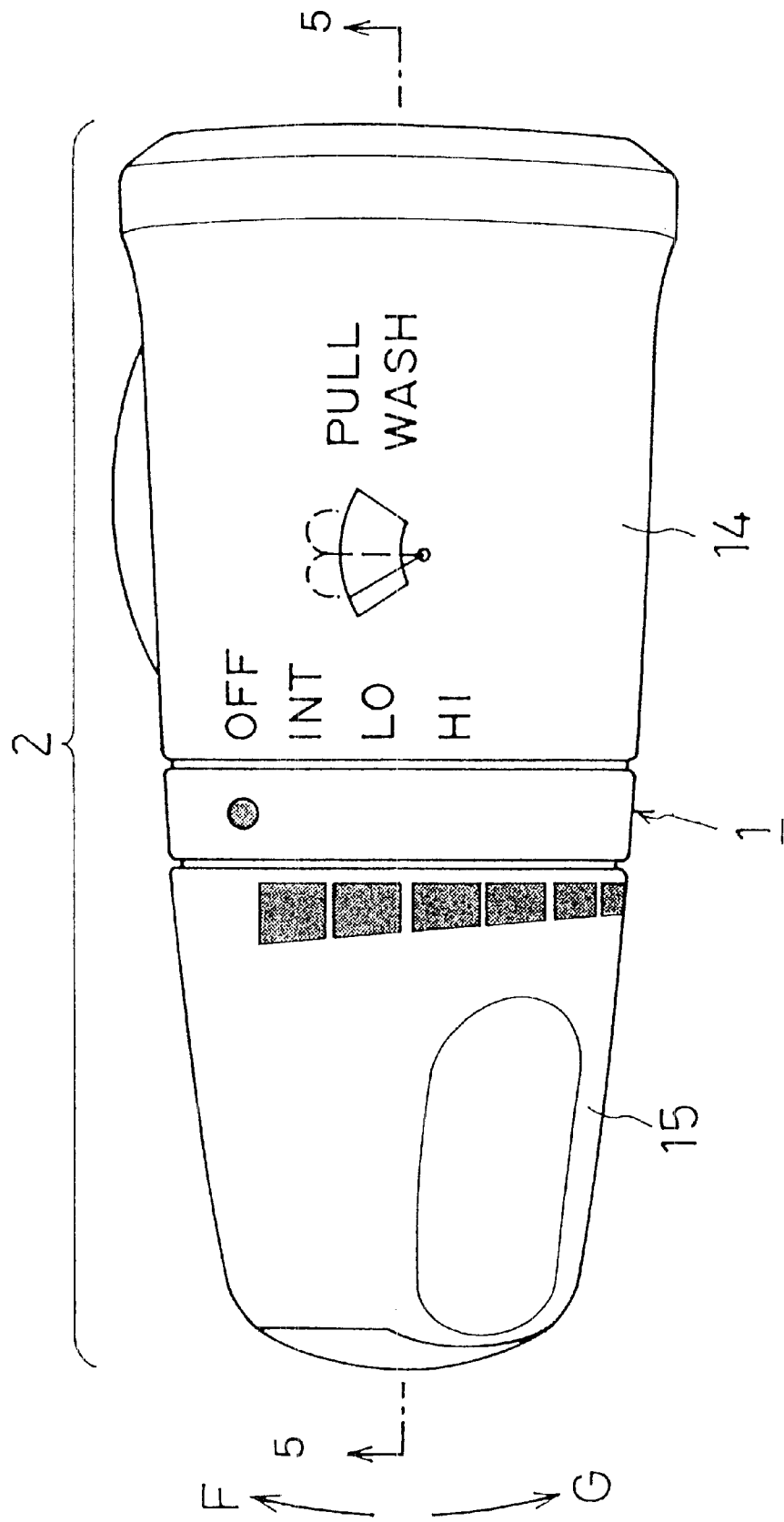
FIG. 4 is an enlarged view of a knob of the embodiment of the invention.

Referring to FIG. 3, the operating lever 1 includes a knob 2 to be gripped by an operator's hand and a lever rod 3 in the shape of a shaft bar. The operating lever 1 has a detent pin 5 attached to a free end of the lever rod 3, remote from a base 3a. The detent pin 5 urged by a detent spring 4 engages a detent groove 6d formed in an inner wall of a case 6, and is held in a later-described predetermined position.

The operating lever 1 is pivotally supported in such a way that the operating lever 1 can pivot in directions shown by arrows A and B about lateral shafts 3b that project in opposite directions from the base 3a of the lever rod 3. When the lever 1 is not operated, the operating lever 1 is at the OFF position where the operating lever is guided by the detent groove 6d formed in the case 6 and has moved in the direction shown by arrow B. Shifting the operating lever 1 in the direction shown by arrow A causes the operating lever 1 to pivot about the lateral shaft 3b in the direction shown by arrow A, so that a pressing portion 3c causes a movable strap 7 to move into contact with a fixed contact 8 to turn on the wiper-and-washer switch.

Figure 1:
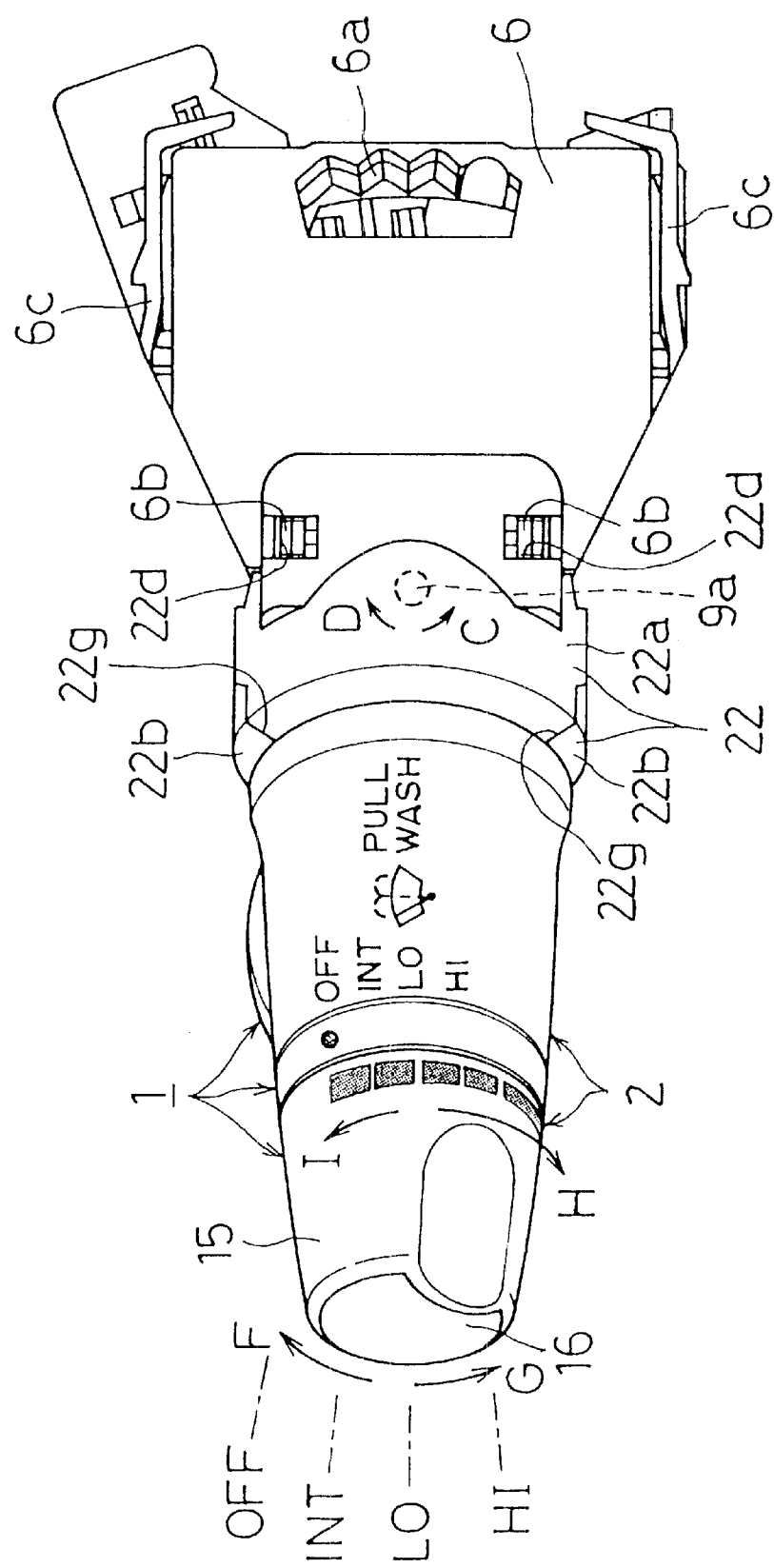
FIG. 1 is a top view illustrating an embodiment of the invention.

As shown in FIG. 1, the operating lever 1 is also pivotally supported in such a way that the operating lever 1 can pivot in directions shown by arrows C and D about vertical shafts 9a and 9b formed on upper and lower portions of the movable board 9. When the operating lever 1 is operated fully in a direction shown by arrow F of FIG. 1, the wiper-and-washer switch is at the wiper-stop position (OFF position). When the operating lever 1 is sequentially operated from the OFF position in a direction shown by arrow G, the operating lever 1 pivots about the vertical shafts 9a and 9b on the movable board 9 in the direction shown by arrow C, so that the movable strap 10 formed on the underside of the movable board 9 moves into contact with respective contacts 11 sequentially; an INT position where the wiper operates intermittently, then a LO position where the wiper operates at low speed, and finally a HI position where the wiper operates at high speed.

The entire operating lever 1 serves as an operating knob for the wiper-and-washer switch. Referring to FIG. 3, the wiper-and-washer switch is a switch that includes the operating lever 1, the movable board 9, the detent spring 4, the detent pin 5, the case 6, the movable straps 7 and 10, the fixed contacts 8 and 11, and an electrode board 12.

As shown in FIG. 3, the lever rod 3 has lateral shafts 3b that project in opposite directions from substantially the middle of the lever rod 3. The lever rod 3 is journaled in the case 6. The lever rod 3 has a blind hole on its case 6 side, the blind hole 3d being formed in an end surface of the base 3a and receiving the detent spring 4 and detent pin 5 inserted therein. The lever rod 3 has a pressing portion 3c formed on the underside of the base 3a, the pressing portion 3c pressing the movable strap 7. The lever rod 3 has a shaft portion 3e formed on a portion gripped by the operator's hand, the shaft portion 3e including a stepped portion 3f of a large diameter and a fastening portion 3g in the shape of a claw.

Figure 5:
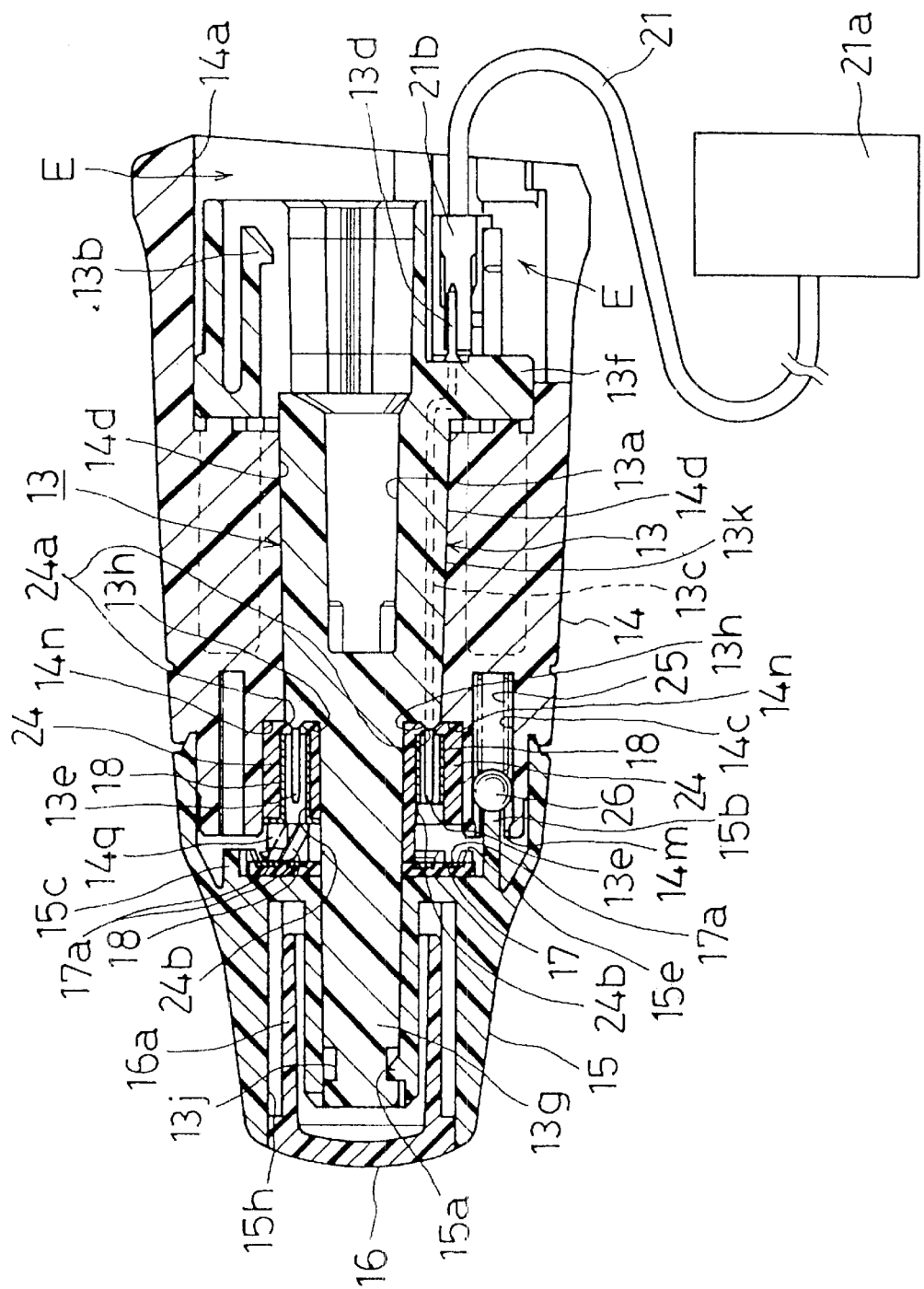
FIG. 5 is a cross-sectional view taken along lines 5—5 of FIG. 4.

As shown in FIG. 3, the shaft 3e can be assembled to a terminal block 13 in one assembly step by fittingly inserting the tip of the shaft 3e into a blind-hole-like opening 13a formed in a terminal block 13, causing the stepped portion 3f to abut the surface of the terminal block 13 that defines the opening 13a, and causing the fastening portion 3g to engage a resilient fastening strap 13b. As shown in FIG. 5, the lever rod 3 has the terminal block 13, a fixed first knob 14, a rotary second knob 15, a cap 16, a circuit board 17, and a contact plate 18, all of which are assembled on the shaft 3e.

With the base portion 3a inserted into the movable board 9, the lever rod 3 is journaled at the lateral shaft 3b. Therefore, the base portion 3a can pivot upward and downward in the movable board 9 for the wiper-and-washer operation. The movable board 9 has the vertical shaft 9a formed on the underside thereof and the vertical shaft 9b formed on the top surface thereof, the vertical shaft 9a rotatably fitting into the hole 12a formed in the electrode board 12 and the vertical shaft 9b rotatably fitting into the hole 6a formed in the case 6. In this way, the base portion 3a of the lever rod 3 is positioned between the case 6 and the electrode board 12 fitted over the case 6.

Figure 2:
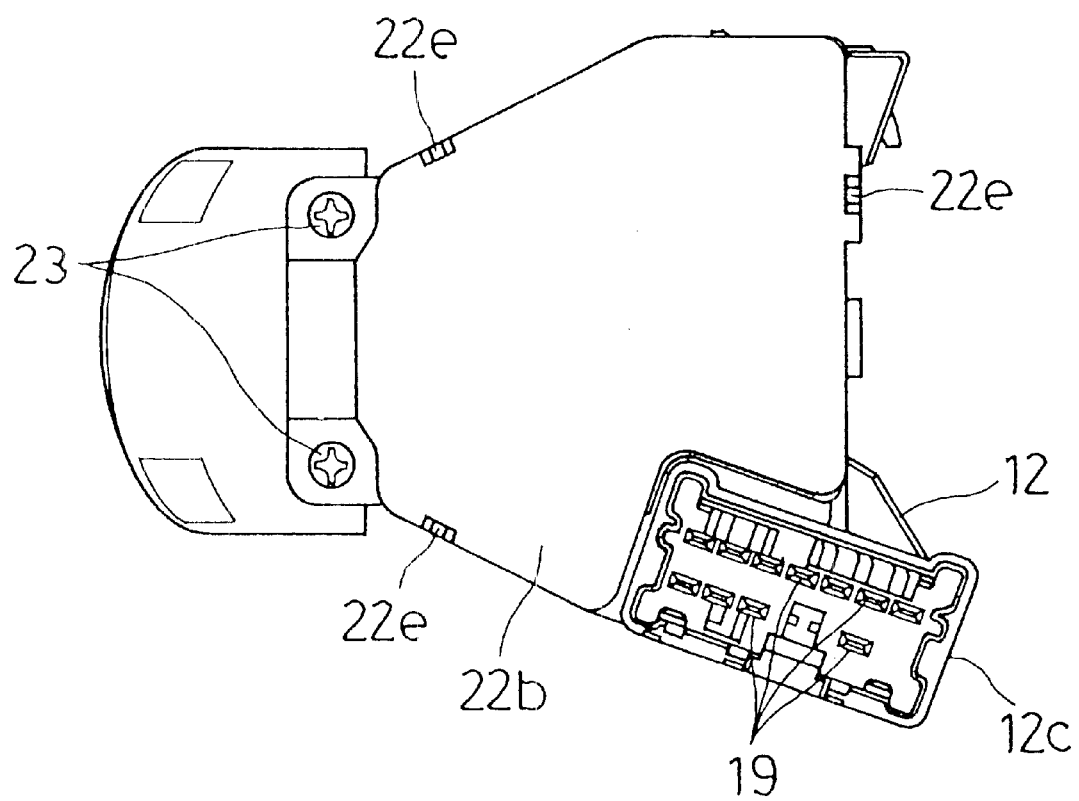
FIG. 2 is a top view of the embodiment of the invention illustrating an electrode board having a boot.

As shown in FIG. 3, the electrode board 12 includes the circuit board 20 to which a plurality of terminals 19 formed of an electrically conductive metal plate are soldered, the plurality of terminals being continuous to the fixed contacts 8 and 11 as well as projecting into a connector 12c as shown in FIG. 2. The plurality of terminals 19 are mounted at one end thereof to the circuit board 20. Some 19a of the plurality of terminals 19 have male portions 19b that laterally project from the side portion of the electrode board 12 closer to the operating lever 1. The male portions 19b connect to female terminals 21a of a wire harness 21, which in turn is connected to male terminals 13d of conductive bodies 13c of the terminal block 13.

The wire harness 21 has at its one end female terminals 21a, and at its other end female terminals 21b connected to the male terminals 13d. As shown in FIG. 3, the wire harness 21 is routed below the lever rod 3 and is covered by a boot 22, so that the entire wire harness 21 cannot be seen practically.

The female terminals 21a and 21b and male terminals 13d and 19b may be of any kind and shape, provided that they are electrically conductive. The female terminals 21a may be, for example, a connector such as that of FIG. 5.

The boot 22 includes an upper boot 22a that covers the upper portion of the lever rod 3 projecting from the case 6, and a lower boot 22b that fits to the upper boot 22a to form a hollow body having a second opening 22c. As shown in FIG. 3, the second opening 22c is as large as the first opening 14a of the fixed knob 14 and is disposed near the opening 14a to oppose the opening 14a.

As shown in FIG. 1, the upper boot 22a has a fastening portion 22d in the form of a hole which engages a fastening portion 6b in the form of a claw formed on the case 6. The upper boot 22a is fitted to the lower boot 22b with the engagement portion 22d engaging the fastening portion 6b, thereby being fixedly mounted to the case 6.

The lower boot 22b has a cover 22f formed in a one piece construction with the upper boot 22a, the cover 22f covering the underside of the circuit board 20. As shown in FIG. 2, the lower boot 22b has the fastening portion 22e formed around the cover 22f and is fastened to the electrode board 12. The lower boot 22b is also fixed to the electrode board 12 by means of screws 23.

As shown in FIG. 5, the terminal block 13 includes electrically conductive bodies 13c that are insert-molded, each of the electrically conductive bodies 13c including a male terminal 13d and a male terminal 13e formed in one-piece construction. The male terminals 13d project outwardly from a flange portion 13f, and the male terminals 13e project outwardly from a surface of a stepped portion 13h. There are provided, for example, two electrically conductive bodies 13c. The male terminals 13d formed at one end of the electrically conductive bodies 13c are connected to the female terminals 21b, and the male terminals 13e formed at the other end are connected to the circuit board 17 via the contact plate 18. The terminal block 13 serves as a relay member through which the electrode board 12 and the circuit board 17 are electrically connected to each other.

Figure 6:
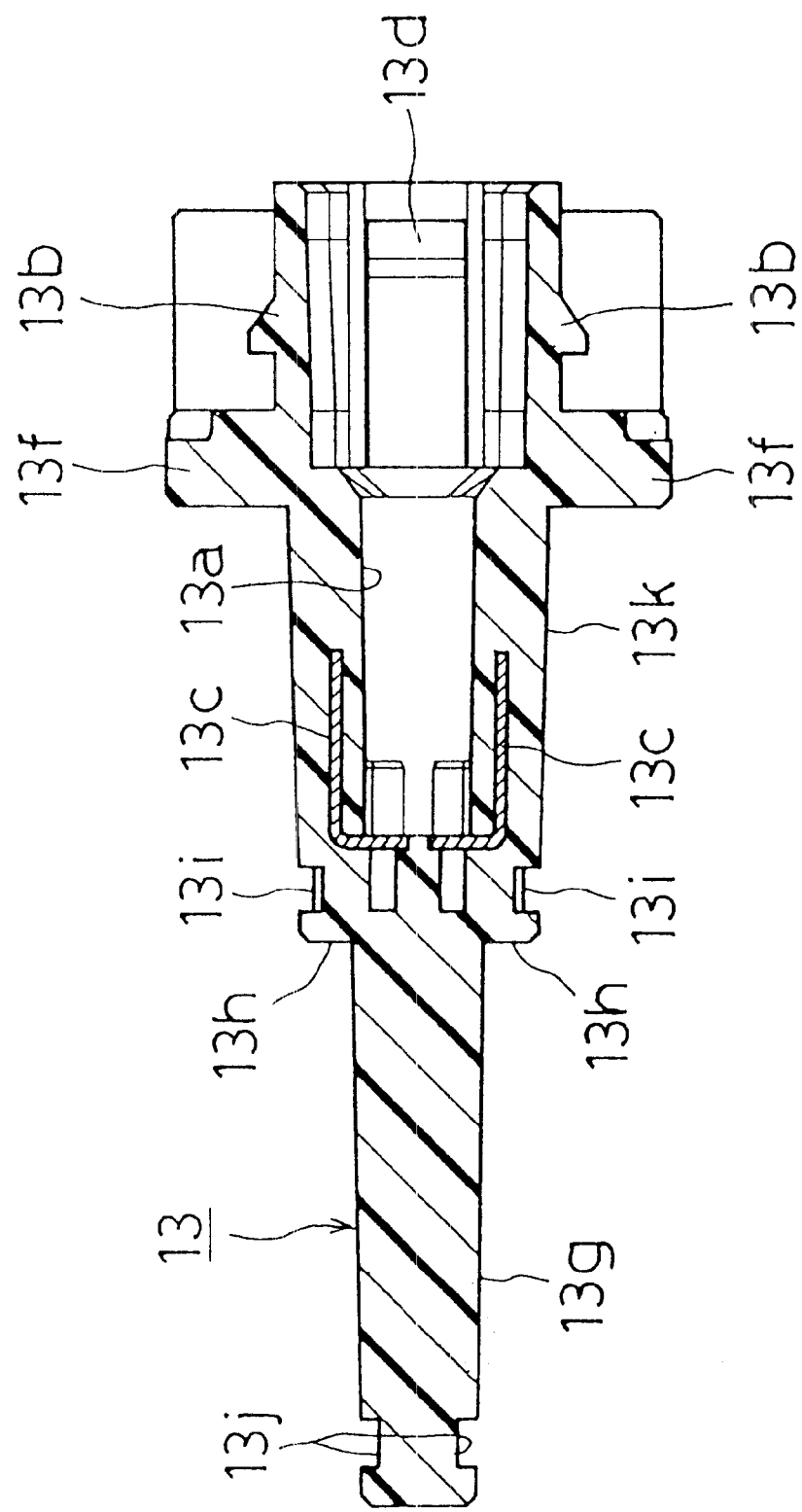
FIG. 6 is an enlarged longitudinal cross-sectional view of a terminal block of the embodiment of the invention.

As shown in FIG. 6, the terminal block 13 is formed with an opening 13a at a location closer to the case 6 into which the tip of the lever 3 is fitted, and a fastening groove 13i in the middle of the terminal block 13. The fastening groove 13i is engaged with a fastening strap 14b of the fixed knob 14 in FIG. 7, thereby holding the fixed knob 14 in position. The shaft 13g has an insulator 24 fitted over a base portion of the shaft 13g, and receives the fastening strap 15a in an annular groove 13j formed in a portion near a tip of the shaft 13g, thereby rotatably holding the rotary knob 15. In this manner, the terminal block 13 extends through the fixed knob 14 and insulator 24 to hold the fixed knob 14 and insulator 24, and also serves as a shaft on which the rotary knob 15 is journaled.

As shown in FIG. 5, the fixed knob 14 has a space E that opens at the opening 14a. The space E houses the flange portion 13f, resilient fastening strap 13b, and male terminal 13d of the terminal block 13. The boot 22 disposed to oppose the opening 14a prevents the space E from being seen from the operator side. The fixed knob 14 is disposed between the boot 22 and the rotary knob 15 such that the boot 22 is positioned on the case 6 side of the fixed knob 14, and the rotary knob 15 is positioned on the tip side of the fixed knob 14. Thus, the entire operating lever 1 is in the shape of a cone.

Figure 7:
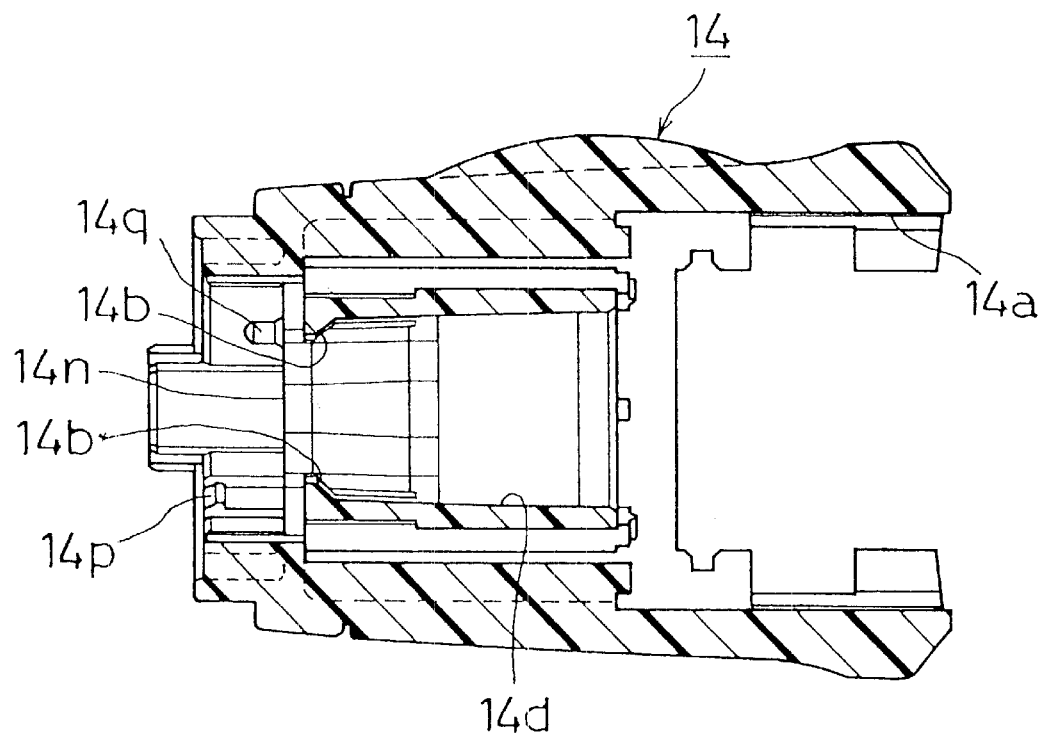
FIG. 7 is an enlarged longitudinal cross-sectional view of a fixed knob of the embodiment of the invention.
Figure 8:
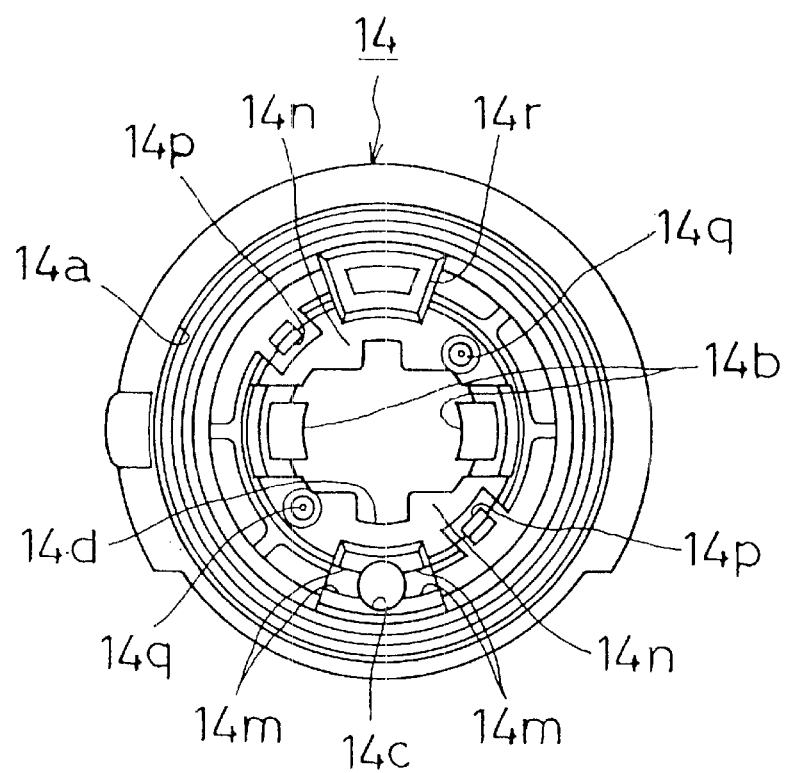
FIG. 8 is an enlarged end view of a fixed knob of the embodiment of the invention.
Figure 9:
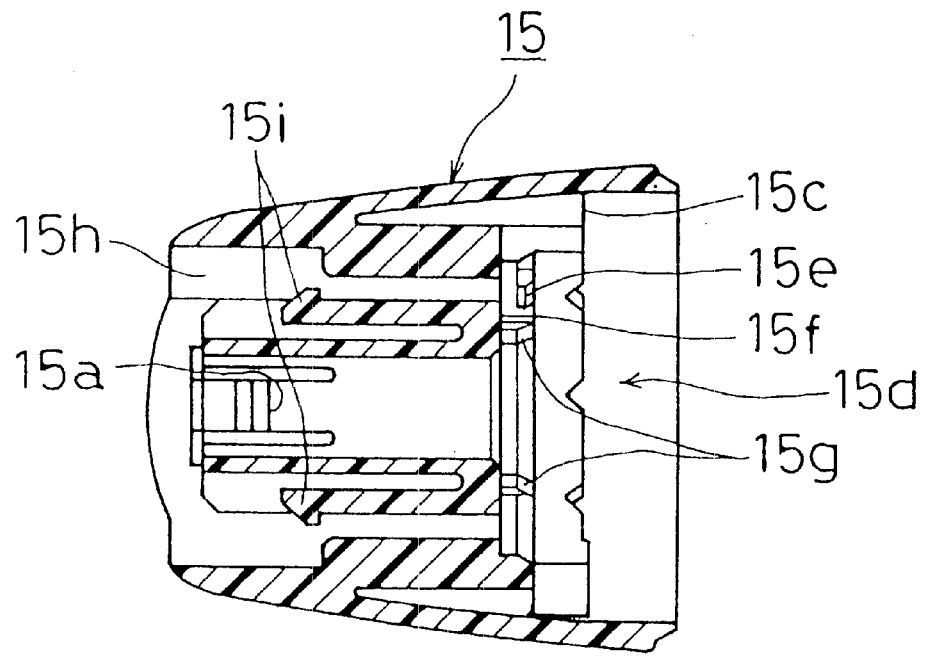
FIG. 9 is an enlarged longitudinal cross-sectional view of rotary knob of the embodiment of the invention.
Figure 10:
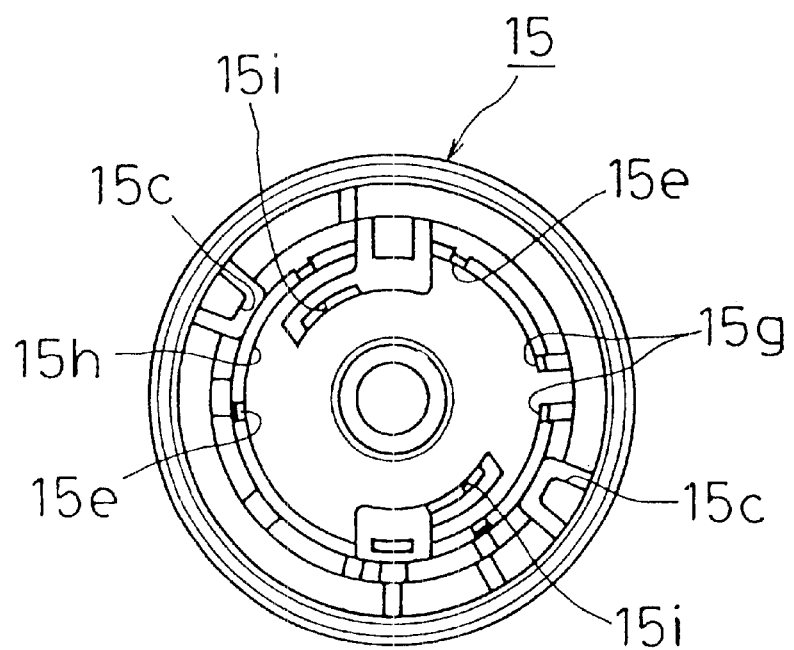
FIG. 10 is an enlarged side view of the rotary knob of the embodiment of the invention.
Figure 11:
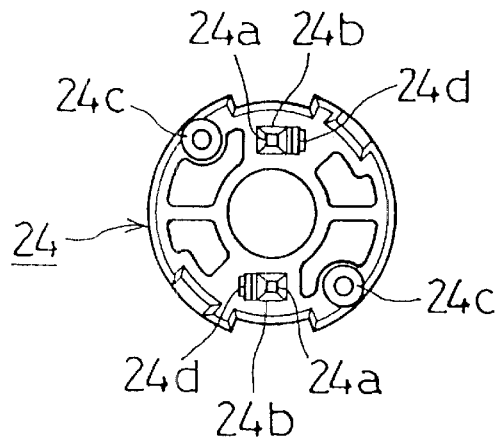
FIG. 11 is an enlarged side view of an insulator of the embodiment of the invention.
Figure 12:
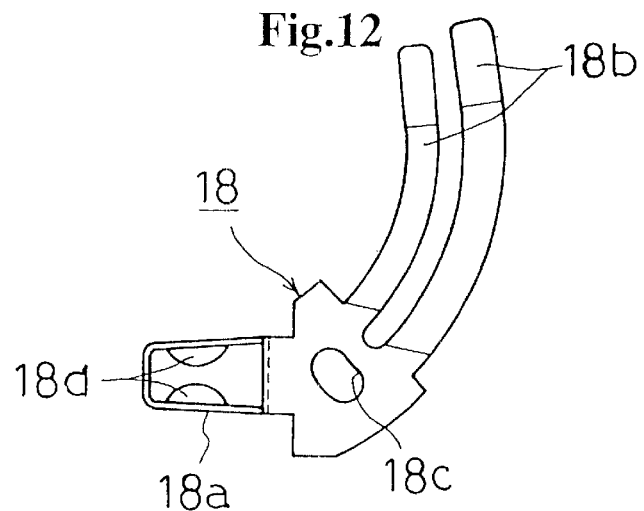
FIG. 12 is an enlarged front view of a contact plate of the embodiment of the invention.
Figure 13:
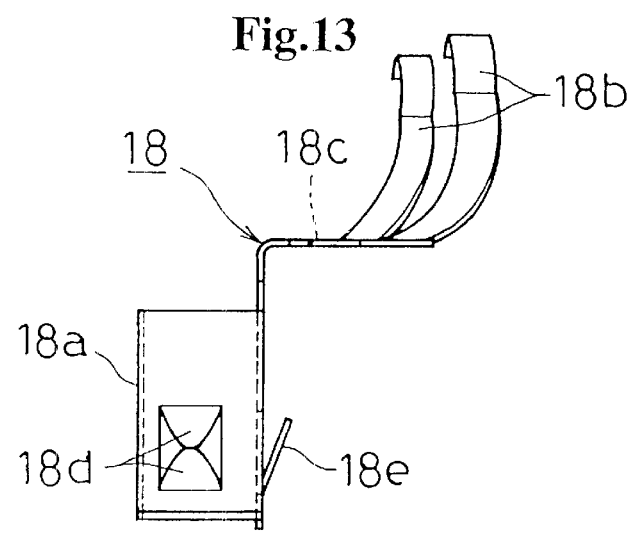
FIG. 13 is an enlarged side view of the contact plate of the embodiment of the invention.

As shown in FIGS. 5, 7, and 8, there are provided a blind hole 14c, an arcuate groove 14m, a stepped surface 14n, a pull-out preventing strap 14p, a projection 14q, and a stopper 14r on the rotary knob 15 side of the fixed knob 14. The blind hole 14c receives the detent spring 25 and detent ball 26 inserted therein. The arcuate groove 14m extends through the center of the blind hole 14c and loosely receives the detent flange 15b having a detent cam. The stepped surface 14n is flush with the stepped surface 13h and fits into the insulator 24. The pull-out preventing strap 14p supports the insulator 24 fitted over the stepped surface 14n. The projection 14q prevents the insulator 24 from rotating. The stopper 14r obstructs an abutment portion 15c of the rotary knob 15 to define an extent in which the rotary knob 15 can rotate.

The fixed knob 14 is formed with a through-hole 14d which extends through the center axis thereof and into which a medium diameter portion 13k is rotatably inserted. The inner surface that defines the through-hole 14d is continuous to the stepped surface 14n formed on the rotary knob 15 side.

As shown in FIG. 5, the insulator 24 is fixed to the shaft 13g of the terminal block 13 by means of the male terminals 13e inserted into the through-hole 24a, thereby being placed in position in the through-hole 14d formed in the fixed knob 14. The insulator 24 is substantially in the shape of a thick disk having the contact plate 18 mounted thereon 15 with which a movable contact 17a of the circuit board 17 moves into contact. The insulator 24 is formed with a coupler 24b in the shape of a hole that receives terminals 18a of the contact plate 18 of FIGS. 12 and 13. The coupler 24b is in communication with the through-hole 24a.

The contact plate 18 is a fixed-contact member formed of an electrically conductive flat metal spring material. The contact plate 18 has, for example, two sheets of resilient contacts 18b formed at one end, the terminal 18a formed at the other end, and a fastening hole 18c formed in the middle. The resilient contacts 18b serve as a fixed contact. A projection 24c formed on the insulator 24 is pressure-fitted into the fastening hole 18c.

The terminals 18a are formed by pressing the contact plate 18 into a female terminal shape. The terminals 18a have inwardly projecting pressure contacts 18d that are in pressure engagement with the male terminals 13e, and the pull-out preventing claw 18e that outwardly projects and is fastened to the fastening portion 24d provided adjacent the coupler 24b.

The insulator opposes the circuit board 17 that has the movable contact 17a in the form of, for example, a resistor. The movable contact 17a forms a variable resistor for controlling an intermittent wiper operation of the wiper switch apparatus. The circuit board 17 fits to a stepped portion 15f formed in an inner space 15d of the rotary knob 15, and is engaged with the fastening portion 15e that projects into the inner space 15d, so that the circuit board 17 is prevented from dropping. An anti-rattle projection 15g formed in the inner wall of the rotary knob 15 abuts the circuit board 17 so that the circuit board 17 fits to the rotary knob 15 without rattling.

As shown in FIG. 1, the rotary knob 15 is a substantially hollow cylinder that serves as an operating knob for controlling the variable resistor for the intermittent wiper function of the wiper switch apparatus. When the operating lever 1 is at the INT position where the wiper operates intermittently, rotating the rotary knob 15 allows setting of a desired interval of the intermittent wiper operation.

The inner space 15d of the rotary knob 15 fittingly rotatably receives the fixed knob 14. The inner space 15d has an opening 15h that is formed at a tip end of the space 15d and closed by a cap 16. The cap 16 fits into the opening 15h that opens to the tip of the rotary knob 15, and a hole (not shown) formed in a hollow portion 16a receives a claw of a resilient fastening strap 15i of the rotary knob 15 shown in FIG. 9. Thus, the cap 16 is fixed to the rotary knob 15 and rotates together with the rotary knob 15.

The present invention of the aforementioned structure will be described in terms of assembly procedure, wiring, and operation with reference to the accompanying drawings.

The tip of the lever rod 3 is inserted into the opening 13a of the terminal block 13. The fastening portion 3g of the lever rod 3 is fastened to the resilient fastening strap 13b, so that the lever rod 3 is fixed to the terminal block 13. Then, the contact plate 18 is pressed into the insulator 24 to be fixed thereto. The insulator 24 is inserted deep into the shaft 13g to connect the terminal 18a of the contact plate 18 to the male terminal 13e, so that the fastening strap 14b fixes the insulator 24 in the fixed knob 14.

The circuit board 17 is pushed into the inner space 15d of the rotary knob 15 so that the fastening portion 15e fixes the circuit board 17 to the rotary knob 15. The rotary knob 15 is inserted into the shaft 13g so that the annular groove 13j receives the fastening strap 15a. Thus, the shaft 13g rotatably supports the rotary knob 15. The cap 16 is attached to the opening 15h of the rotary knob 15.

The lever rod 3 is inserted into the movable board 9 so that the lateral shaft 3b is journaled by the movable board 9. The female terminals 21b at one end of the wire harness 21 are connected to the male terminals 13d of the terminal block 13, and the female terminals 21a at the other end are connected to the male terminals 19b. The detent spring 4 and detent pin 5 are inserted into the blind hole 3d of the lever rod 3, the lower vertical shaft 9a of the movable board 9 is received in a bearing hole 12a of the electrode board 12, and the upper vertical shaft 9b is received in a bearing hole 6a of the case 6, whereby the electrode board 12 is engaged with the case 6.

Then, the lower boot 22b is assembled to the electrode board 12 to cover the wire harness 21 and the circuit board 20, thereby preventing the wire harness 21 and the circuit board 20 from being seen from outside as well as protecting them from external forces. With the cutout 22g receiving the upper boot 22a, the upper and lower boots 22b and 22a are assembled together into the boot 22. The upper boot 22a is fixed to the case 6 with the engagement portion 22d engaging the fastening portion 6b.

This covers the base portion of the lever rod 3 outwardly projecting from the case 6, making the base portion invisible. Since the boot 22 and fixed knob 14 are located side by side, the opening 14a of the fixed knob 14 and the opening 22c of the boot 22 are opposed to each other, and the lever rod 3 and wire harness 21 assembled into the openings 14a and 22c are practically invisible from the operator side, providing good appearance. As shown in FIG. 1, the operating lever 1 and boot 22 are arranged such that they describe a substantially conical shape as a whole, adding good appearance to the combination switch. When the case 6 is attached into a recess formed in the base of the combination switch, the engaging straps 6c engage the recess allowing mounting of the case 6 to the combination switch in a single assembly step.

The above-described procedure completes the assembly of the combination switch. In order to readily assemble the components including the terminal block 13, wire harness 21, fixed knob 14, insulator 24, contact plate 18, circuit board 17, rotary knob 15, and cap 16, to the lever rod 3, it is only necessary to press all of the components along the axis of the shaft 3e.

The lever rod 3, detent spring 4, detent pin 5, and female terminals 21 a are inserted into the case 6 and electrode board 12 in a lateral direction. Therefore, they can be easily assembled. The other components in the case 6 and electrode board 12 are assembled by inserting vertically. The respective members of the switch are assembled by fastening means such as fastening straps and claws. This construction allows automatic assembly of the entire switch.

The electrically conductive bodies 13c are insert-molded in the terminal block 13 such that the male terminals 13e of the conductive bodies 13c fit to the contact plate 18, and the male terminals 13d of the conductive bodies 13c fit into the female terminals 21b of the wire harness 21. The female terminals 21a of the wire harness 21 are fitted to the male terminals 19b, thereby making electrical connection. Thus, the construction provides an efficient wiring operation and eliminates the need of soldering.

When the wiper switch is at the OFF position where the wiper is turned off, the operating lever 1 has been operated fully in a direction of arrow F. Shifting the operating lever 1 from the OFF position in the direction shown by arrow G allows the operating lever 1 and movable board 9 to pivot about the vertical shafts 9a and 9b in the direction shown by arrow C, so that a movable contact strap 10 disposed below the movable board 9 moves into contact with the respective fixed contacts in sequence; the INT position where the wiper operates intermittently, then the LO position where the wiper operates at low speed, and finally the HI position where the wiper operates at high speed.

When the operating lever 1 is at the INT position, operating the variable resistor for wiper operation mounted to the rotary knob 15 causes the rotary knob 15 to rotate about the shaft 3e, so that the movable contacts 17a in the form of a resistor moves into contact with the contact plate 18, thereby allowing adjustment of the interval of the intermittent operation of the wiper. When the rotary knob 15 is rotated in directions shown by arrows H and I, the rotary knob 15 is allowed to rotate until the abutment portion 15c abuts the stopper 14r of the fixed knob 14.

When the operator's hand is away from the operating lever 1, the wiper-and-washer switch is at the OFF position. Pulling up the operating lever 1 in the direction shown by arrow A causes the pressing portion 3c of the lever rod 3 to push down the movable contact strap 7 such that the movable contact strap 7 moves into contact with the fixed contacts 8. Thus, the wiper-and-washer switch comes ON to eject the washer liquid onto the front windshield and causes the wiper to reciprocally move.

When the operator's hand is away from the operating lever 1, the detent pin 5 urged by the detent spring 4 slides on an inclined surface of the detent groove 6d, and the operating lever 1 returns to the OFF position or home position. The movable contact strap 7 for the wiper-and-washer takes the form of a flat spring and returns to the home position, i.e., the OFF position together with the lever rod 3.

The present invention of the aforementioned construction provides the following advantages.

The invention is a lever switch having a lever rod with a first knob and a boot, the lever rod being arranged such that one end of the lever rod is pivotal in a case and the other end thereof projects outwardly from the case, and the boot receiving the lever inserted thereinto and being fixed to the case. The lever switch is characterized in that the first knob has a first opening formed on a side of the first knob facing the case; and the boot has a second opening formed to oppose the first opening, the second opening being in the vicinity of the first opening of the first knob. Thus, the openings of the first knob and the boot are not visible from the operator side, and therefore, the entire lever switch is of good appearance.

The invention is further characterized by the boot including a lower boot that covers a wire harness that connects to a switch mounted to the lever rod, and an upper boot that fits to the lower boot. Thus, the lower boot and upper boot can be assembled to each other after the lever and other components have been assembled to the case. As a result, the boots are easily assembled and cover the wire harness.

The invention is further characterized by the lower boot having a cover formed in one-piece construction with the lower boot, the cover covering a circuit board mounted to an electrode board that is provided at a base of the lever rod. Thus, without increasing the number of parts, the cover can cover and protect the terminals mounted to the circuit board, electrical components, electronic elements and soldered portion of these components.

The invention is further characterized by the lower boot being fixed to the electrode board, and the upper boot being fixed to the case that engages the electrode board. Thus, the upper and lower boots can easily be fixed to the case and electrode board.

The invention is further characterized by the boot being provided on the side of the first knob opposing the case, and a rotary second knob on the other side of the first knob; wherein outer surfaces of the rotary second knob, the first knob, and the boot are continuously aligned to form a substantial cone shape. Thus, the wire harness and lever can be hidden in the boots and the entire operating lever can be made conical with good appearance.

What is claimed is:

1. A lever switch having a lever rod with a first knob and a boot, the lever rod being arranged such that one end of the lever rod is pivotal in a case, and the other end thereof projects outwardly from the case, and the boot receiving the lever inserted thereinto and being fixed to the case;

wherein the first knob has a first opening formed on a side of the first knob facing the case; and wherein the boot has a second opening formed to oppose the first opening, the second opening formed to oppose the first opening, the second opening being in the vicinity of the first opening of the first knob.

2. The lever switch according to claim 1, wherein the boot includes a lower boot that covers a wire harness that connects to a switch mounted to the lever rod, and an upper boot that fits to the lower boot.

3. The lever switch according to claim 2, wherein the lower boot has a cover formed in once piece construction with the lower boot, the cover covering a circuit board mounted to an electrode board that is provided at a base portion of the lever rod.

4. The lever switch according to claim 3, wherein the lower boot is fixed to the electrode board, and the upper boot is fixed to the case which engages the electrode board.

5. The lever switch according to claim 4, wherein the boot is provided on the first side of the knob, and a rotary second knob is provided on a second side of the first knob; and wherein outer surfaces of the rotary second knob, the first knob, and the boot are continuously aligned to form a substantial cone shape.

6. The lever switch according to claim 3, wherein the boot is provided on the first side of the knob, and a rotary second knob is provided on a second side of the first knob; and wherein outer surfaces of the rotary second knob, the first knob, and the boot are continuously aligned to form a substantial cone shape.

7. The lever switch according to claim 2, wherein the boot is provided on the first side of the knob, and a rotary second knob is provided on a second side of the first knob; and wherein outer surfaces of the rotary second knob, the first knob, and the boot are continuously aligned to form a substantial cone shape.

8. The lever switch according to claim 1, wherein the boot is provided on the first side of the knob, and a rotary second knob is provided on a second side of the first knob; and wherein outer surfaces of the rotary second knob, the first knob, and the boot are continuously aligned to form a substantial cone shape.

9. The lever switch according to claim 1, wherein the lever switch has an operator side, and wherein said first and second openings are not visible from the operator side.

10. The lever switch according to claim 1, further comprising a wire harness that has a first end connected to terminals within said case, a second end connected to terminals within said first knob, and a portion between said first and second ends that extends through said first and second openings.

11. The lever switch according to claim 10, wherein the lever switch has an operator side, and wherein said wire harness is not visible from said operator side.

12. A lever switch comprising:

a case;

a lever rod having a first end pivotally mounted in said case and a second end projecting outwardly from said case;

a first knob connected to said second end of said lever rod, said first knob having a first opening on a side of the first knob facing the case;

a boot fixed to said case that covers a portion of said lever rod extending from said case between said first knob and said case, said boot having a second opening on a side facing the first opening; and a wire harness that extends together with said lever rod through said first and second openings, said wire harness having a first end connected to terminals within said case and a second end connected to terminals within said first knob;

said first knob and said boot having outer surfaces that are adjacent to each other and aligned to form a substantially continuous shape that covers said wire harness and said lever rod from view.

13. The lever switch according to claim 12, further comprising a second knob rotatably mounted on a side of said first knob opposite of said boot, and wherein outer surfaces of the second knob, the first knob, and the boot are continuously aligned to form a substantial cone shape.

14. The lever switch according to claim 12, wherein the boot includes a lower boot that covers said wire harness, and an upper boot that fits to the lower boot.

15. The lever switch according to claim 14, wherein the lower boot has a cover portion covering a circuit board mounted to an electrode board provided at a base portion of the lever rod.

16. The lever switch according to claim 15, wherein the upper boot and the electrode board are fixed to the case, and the lower boot is fixed to the electrode board.

* * * * *